United States Patent [19]

Sakaguchi et al.

[11] 3,748,029
[45] July 24, 1973

[54] FILM TRANSPORT CONTROL DEVICE FOR A MOTION PICTURE CAMERA

[75] Inventors: Keiichi Sakaguchi, Yokohama; Hiroshi Furukawa, Tokyo; Yoshio Komine, Tokyo; Mamoru Shimazaki, Tokyo, all of Japan

[73] Assignee: Canon Kabushiki Kaisha, Tokyo, Japan

[22] Filed: Dec. 22, 1971

[21] Appl. No.: 210,754

[30] Foreign Application Priority Data
Dec. 28, 1970 Japan.............................. 45/128438
Dec. 28, 1970 Japan...... 45/139438 (utility model)

[52] U.S. Cl................................... 352/91, 352/217
[51] Int. Cl. .......................................... G03b 21/36
[58] Field of Search............................. 352/91, 217

[56] References Cited
UNITED STATES PATENTS
1,597,229   8/1926   Ball...................................... 352/91
3,246,944   4/1966   Winkler............................... 352/91
3,549,249   12/1970  Katsuyama......................... 352/217

Primary Examiner—Samuel S. Matthews
Assistant Examiner—Monroe H. Hayes
Attorney—Toren and McGeady

[57] ABSTRACT

In a motion picture camera a film transport control device is arranged to perform fade-in and fade-out automatically. The film transport control device includes a drive system with a drive motor which is connected to a shutter. A rotatable programming member is linked to the drive system and rotates in one direction regardless of the direction of rotation of the drive system. Switches associated with the programming member are arranged so that during, at most, one rotating cycle of the programming member two change-overs take place, one from normal winding to rewind-back and a second from rewind-back to normal winding. A control member is arranged for activating the fade-in and fade-out operation. An operating knob in engagement with the programming member and the drive system is provided on the camera for achieving overlapping photography by establishing the desired rotational movement of the drive system.

17 Claims, 14 Drawing Figures

Patented July 24, 1973

Keiichi Sakaguchi
Hiroshi Furukawa   INVENTORS
Yoshio Komine
Mamoru Shimazaki

BY Toren and McGeady
ATTORNEYS

INVENTORS
Keiichi Sakaguchi
Hiroshi Furukawa
Yoshio Komine
Mamoru Shimazaki

BY Toren and McGeady ATTORNEYS

Patented July 24, 1973 3,748,029

INVENTORS
Keiichi Sakaguchi
Hiroshi Furukawa
Yoshio Komine
Mamoru Shimazaki

BY Toren and McGeady ATTORNEYS

Patented July 24, 1973

INVENTORS
Keiichi Sakaguchi
Hiroshi Furukawa
Yoshio Komine
Mamoru Shimazaki

BY
Toren and McGeady ATTORNEYS ly or in combination.
FILM TRANSPORT CONTROL DEVICE FOR A MOTION PICTURE CAMERA The present invention relates to a film transport control device for a motion picture camera linked with an automatic fading device, wherein a programming member, which is linked with the driving system for the film transport mechanism and rotates in one direction regardless of the direction of the driving whether to normal forwarding direction or rewinding direction, is provided so that an automatic overlapping by a prescribed amount is made possible, and, at the same time, a directing part, which is linked with an auto-fade mechanism for automatically performing fade-out and fade-in, is provided at the programming member, furthermore, a buffering part is provided between the programming member and auto-fade mechanism to have the overlapping and auto-fading performed either independently or in combination.

Moreover, in the present invention the take up drum is stopped from rotating or its rotating speed is reduced in an automatic manner within such run of film as requiring the control of the take up drum by the above-mentioned programming member, in a camera, which is characterized in that such portion of film as having been fed into the take up side of the magazine chamber, while the rotation of the take up drum is prevented or preferably is reduced at the time of normal transport of film, and having been loosely wound up there, is rewound and performs overlap photographing so that it is suited to such camera as using film having a mechanism to prevent reverse rotation at a take up drum of a magazine being known as Kodapack type Super Eight Film magazine disclosed in German Utility Model No. 1,991.334.

Now the special features of the present invention shall be explained in order.

The first special feature of the present invention exists in that a driving system of a film transport mechanism is automatically linked with a shutter axle and is provided in such manner that it can be engaged with or disengaged from a programming member which can be always biased to one direction regardless of the direction of rotation, whether normal or reverse, of said driving system and controls the normal and reverse transport of film to a prescribed amount, wherein said driving system is made to engage with said programming member in the have the driving system rotated to normal or reverse direction, and stopped thus automatic overlap photographing by movie camera, etc. can be made.

The second special feature of the present invention exists in that a shutter opening angle control mechanism and such driving part as can be engaged or disengaged therewith are provided in the above-mentioned driving system, wherein the engaging or disengaging process is automatically made by a member provided at the above-mentioned programming member, whereby an overlap photographing with a prescribed amount of fade-out and fade-in can be made possible.

The third special feature of the present invention lies in that the rotation of the film take up drum is stopped or reduced for such prescribed period of time as set beforehand, then the rotation is resumed by an activating member such as a cam, etc. provided at the above-mentioned programming member.

The fourth special feature of the present invention exists in providing such a mechanism as maintains an overlap photographing operation member for starting the programming member in an operative state and as automatically returning said operation member to a normal position by a projection, etc. provided at a portion of the programming member when the programming member makes one rotation and competes whole process.

The fifth special feature of the present invention lies in arranging the reverse transport operation so that a second switch linked with a manual shutter opening angle control member is provided in such manner that it works only when a first switch is connected to a reverse transport circuit by said programming member, wherein the second switch cannot function within the rotating angle of the opening angle control member ranging from its opened position to its closed position, and in such range as exceeding the position of "closed", and the second switch is placed in "on" position only when the operation is done with such force as overcoming the force of the biasing spring so that the reverse transport driving is done, while the operation member returns automatically to the closed position when the hand is removed.

The sixth special feature of the present invention lies in that a buffering member is provided within a linking mechanism between the above-mentioned programming member and the auto fading mechanism to retain the auto-fading mechanism in a locked state so that the programming member only can operate thus such overlap photographing without fading process is made possible, and when the overlapping process is not carried out the engaging part between the above-mentioned member provided in the programming member and the auto-fading mechanism becomes free so that the auto-fading photographing can be made independently by the auto-fading operation member.

The seventh special feature of the present invention lies in that the locking member of the shutter opening angle control part and the auto-fading operation member are formed in an integral manner, thereby auto-fading operation cannot be done unless the locking means to hold the shutter opening angle at the time of ordinary photographing at a predetermined angle is released, thus preventing conflicting function by erroneous handling of the device.

The eighth special feature of the present invention lies in providing such intermittent reduction mechanism of a take up drum as being effective and having simple structure.

The ninth special feature of the present invention lies in providing an indication means to indicate operating state of the above-mentioned programming member.

Now, the present invention shall be explained in detail by referring to the drawings of the examples.

Figures 1, 2:
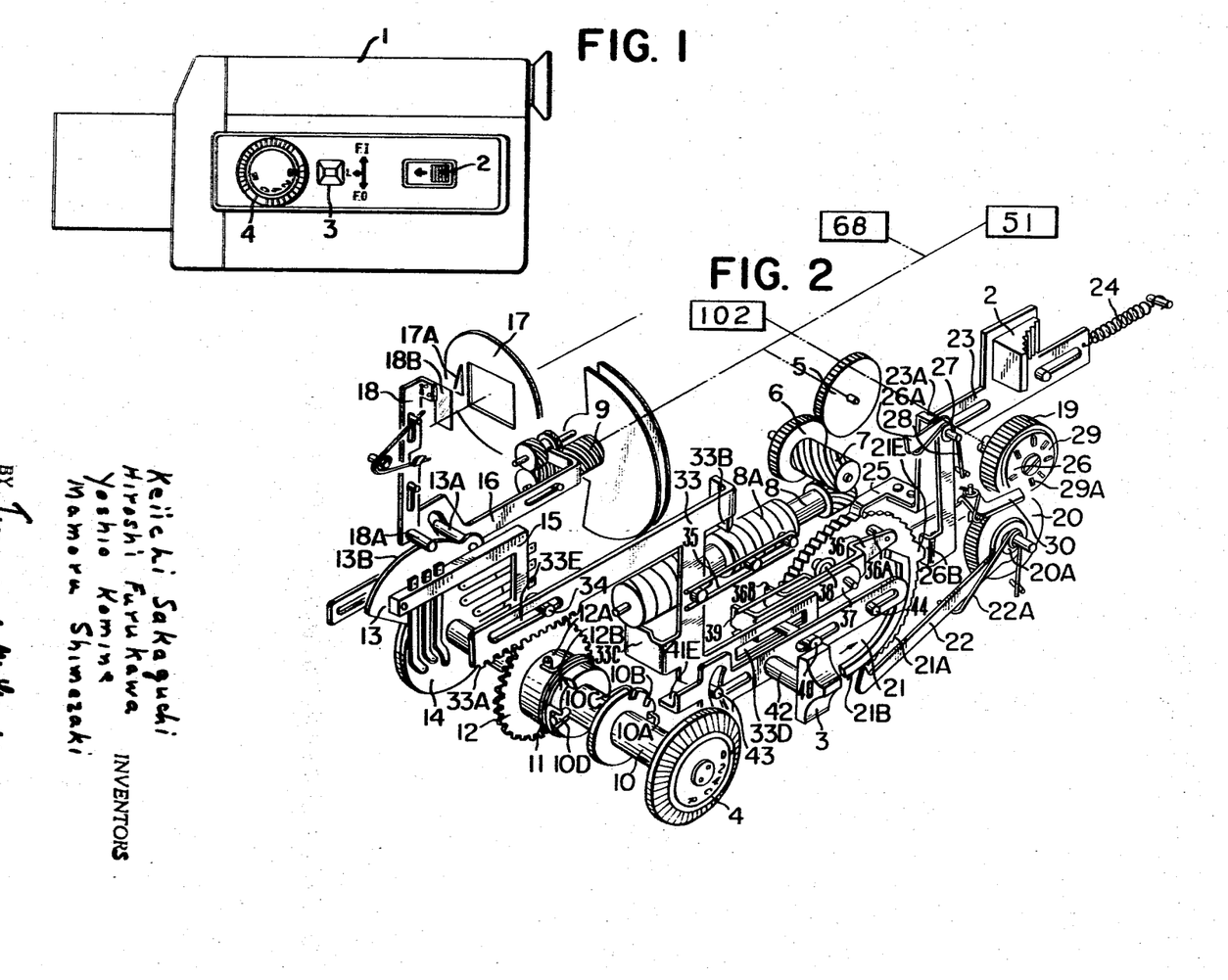
FIG. 1 is an external view of a camera showing operating parts of the same of the first embodiment.
FIG. 2 is a perspective view showing the structure of a first embodiment of the camera in FIG. 1.

In FIG. 1, 1 is the main body of a camera, 2 is an overlap operation member, 3 is an auto-fading operation member, and 4 is a shutter opening angle control member.

Figures 6, 7, 8:
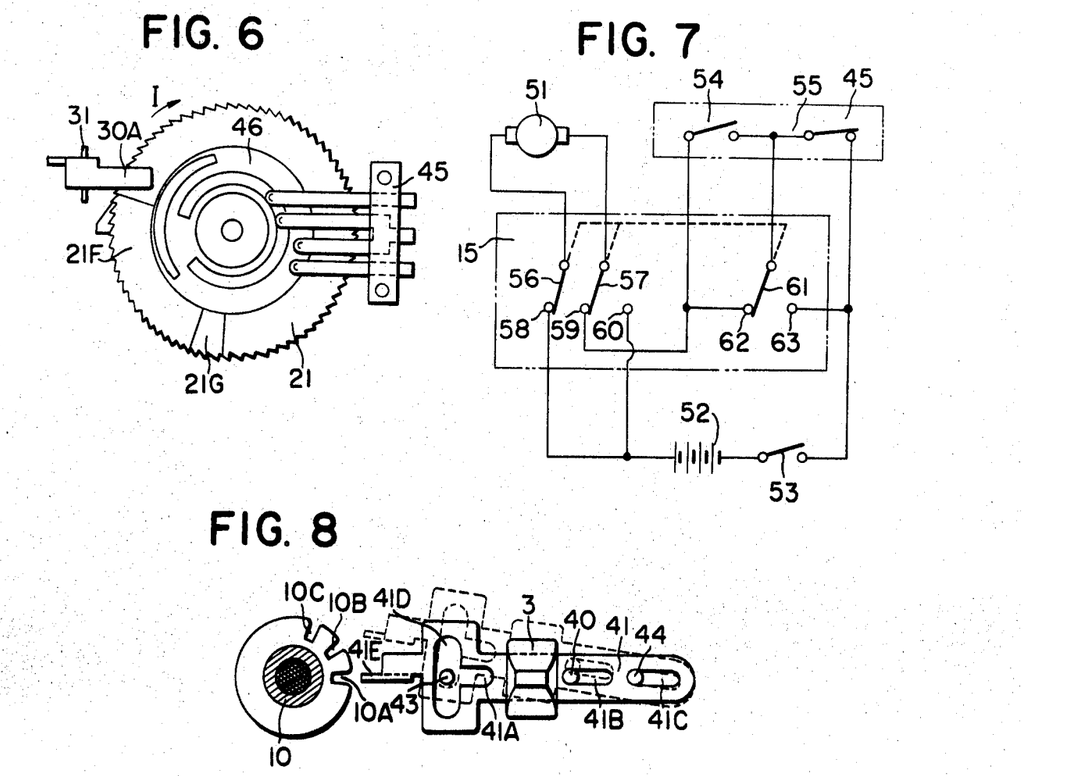
FIG. 6 is a detailed view of a programming member as viewed from rear of the first embodiment.
FIG. 7 is an electric circuit diagram for the first embodiment.
FIG. 8 is a detailed view of an auto-fader control knob part of the first embodiment.

In FIG. 2 and FIG. 6, 5 is a portion of the gears of the driving system comprising a driving motor 51, a claw mechanism 68, and an indicator means 102 associated with one another which transmit the rotation to the auto-fading driving part 3 through a gear 6 and a screwed gear 7. 8A, 8B are a pair of screwed parts having opposite directions of helical angle to each other and provided on the above-mentioned auto-fading driving part 3. 9 is a conventionally known shutter opening angle control mechanism, and the shutter is driven by the motor 51. 10 is an axle of the opening angle control member, and 10A, 10B, 10C are locking notches for fixing the shutter opening angle at a predetermined angle, corresponding to fully opened angle, one-half and one-fourth of shutter opening angle, respectively. 10D is a pin provided on the axle 10 to fix integrally a gear 12 on the axle 10 through a spring 11.

12A is a pin to fix the spring 11 and 12B is a notch formed integral with the gear 12. 13 is a plate rotating in an integral manner with the axle 10 and has a pin 13A, while a portion of the same forms a cam 13B. 14 is a printed circuit board integrally attached to the plate 13, and a second group of switches 15 are contacting with the board 14. 16 is a link member to transmit the movement of the axle 10 to the opening angle mechanism 9 through the pin 13A. 17 is a finder mask and has a shutter opening angle indication part 17A. 18 is a link board, and a pin 18A which is integral with the board 18 moves up and down according to the movement of the cam 13B which has a colored board 18B at the other end which moves up and down against the indication part 17A, therefore the state of opening angle is indicated around the field of the finder.

19 is a film take up drum gear associated withh the motor 51, and 20 is a gear at a part of a driving system and has an eccentric part 20A. 21 is a programming member and has a ratchet toothed part 21A at its outer circumference and a portion 21B without ratchet teeth. 22 is a ratchet advancing claw and rotates the programming member 21 in the direction of an arrow I by the eccentric part 20A of the gear 20. 22A is a spring to press the advancing claw 22 always against the ratchet teeth 21A. At the time of ordinary photographing, while the advancing claw 22 is always in a working condition, its tip is located at the no-teeth part 21B, therefore the programming part 21 is stopped.

23 is a sliding plate having an overlap operation member 2 on a portion of the surface, and is normally located in the right hand position, as viewed in FIG. 2, by a spring 24.

25 is a ratchet teeth advancing spring fixed on a part of the sliding plate 23.

Figure 3:
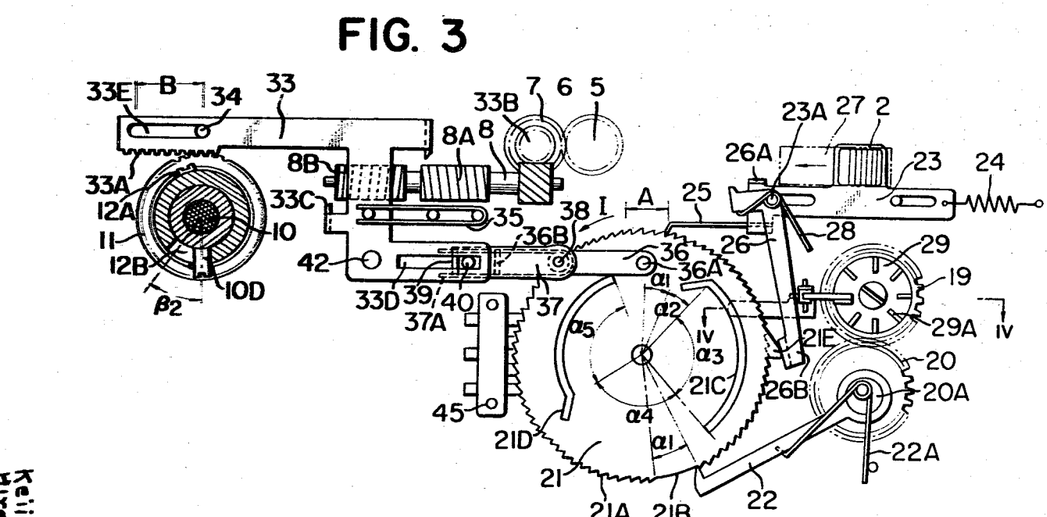
FIG. 3 is a front elevation of a main functioning part.

As the overlap operation member 2 is made to slide to the direction of an arrow shown in FIG. 3, the ratchet teeth advancing spring 25 sends the programming member 21 for a distance, shown by A in the direction of the arrow. As this distance A corresponds to the angle $\alpha_1$ of the no-teeth part 21B, the advancing claw 22 engages with the ratchet teeth 21A by this operation, thus the programming member 21 can start its function. The sliding plate 23 has on another portion of its surface a projection 23A. 26 is a retainer member biased always in the clockwise direction around a fixed axle 27 by a spring 28. 26A is one end of the retainer member 26 and engages and disengages with the projection 23A. 21E is a projection provided at a part of the outer circumferential part of the programming member and is a useful part for releasing the retention of the sliding plate 23 by engaging with the other end 26B of the retainer member 26. When the programming member 21 rotates as much as the angle $\alpha_1$ by the overlap operating member 2, the projecting part 21E comes off the end 26B, therefore the end 26A moves upward while the part 23A of the sliding plate 23 which has moved to the left of the end 26A is retained by the same. Thus the overlap operation member 2 is retained in the state shifted in left hand direction.

At this time the ratchet teeth advancing spring 25 works as a pair with the advancing claw 22, and serves as a stop claw for ratchet advancement.

29 is a member for transmitting the rotation of the take up drum 19 to film through a friction member, and has a plural number of teeth 29A on its surface. 30 is a member engaging or disengaging with the teeth 29A and one end 30A of the same engages or disengages with a cam 21F at the rear surface of the programming member 21. 31 is a supporting axle for the member 30, and the one end 30A of the member 30 is always contacting the rear surface of the programming member 21 by a spring 32.

33 is an auto-fading sliding plate, and has on a part of its surface a rack 33A engaging with the gear 12, and a pair of claw parts 33B, 33C respectively engaging with screwed parts 8A, 8B on the auto-fading driving part 8. 33D, 33E are guiding slots and the slot 33E engages with a fixed axle 34.

35 is a neutral spring to retain the sliding plate 33 at such a central position so that the claw parts 33B, 33C and the screwed parts 8A, 8B do not engage with each other. 36 is a plate which has a pin 36A engaging with the cams 21C, 21D on the programming member 21 and can rotate around an axle 38 on the programming plate 21, further, the plate 36 has at one end a bent part 36B. 37 is a plate being coaxially supported at the axle 38 with the plate 36 and has a bent part 37A, further it is so arranged that the plates 36 and 37 work integrally through a neutral spring 39. 40 is a pin provided on the plate 37 and engages with the slot 33D of the sliding plate 33.

41 is a plate having the auto-fader operation knob 3 attached in an integral manner by a supporting post 42, and it has slots 41A, 41B, 41C and an arc shape slot 41D. The plate 41 further has at its one end a claw part 41E engaging and disengaging with the above-mentioned locking notches 10A, 10B or 10C. 43, 44 are guide axles for the plate 41 (FIG. 8).

Figures 4, 5:
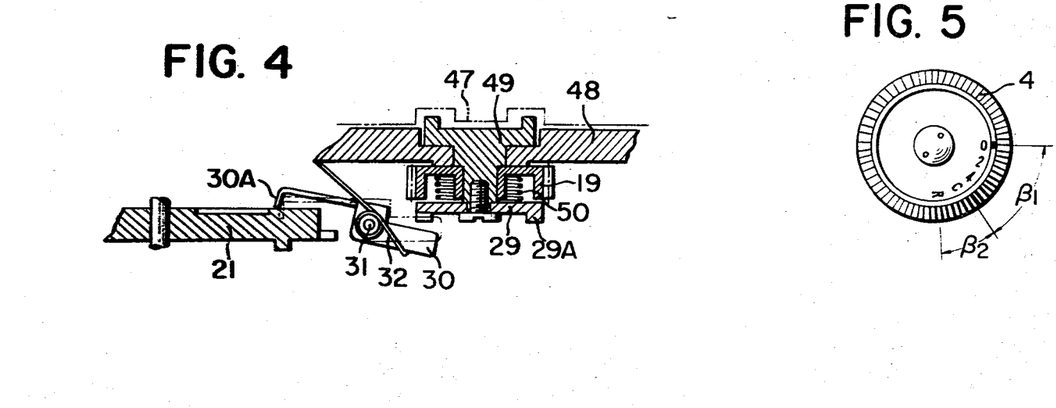
FIG. 4 is a cross-sectional view taken along the line IV — IV of a take up drum part of FIG. 3.
FIG. 5 is a detailed view of an opening angle control knob of the first embodiment.

45 is a first group of switches. 46 is a printed circuit board formed integrally with the rear surface of the programming member 21 and in contact with the first group switches 45 (FIG. 6). In FIG. 4, imaginary lines 47 show a film magazine, and 48 shows a wall of film chamber, 49 shows a take up drum being integral with the member 29, and 50 shows a friction member. In FIG. 6 the cam portion 21F on the rear surface of the programming member 21 is recessed, and corresponds to the angle $\alpha_2 + \alpha_3$ of the cam part of the surface shown in FIG. 3. When the programming member 21 starts functioning by the operation of the overlap operation member 2, the portion 30A of the member 30 falls to the cam portion 21F, and the member 30 prevents the teeth 29A on the member 29 from rotating (refer to imaginary lines in FIG. 4). 21G makes it easy to drive the part 30A into its normal position by its tapered part.

In FIG. 7, 51 is the film driving motor, 52 is the power source, and 53 is a release switch. 54 and 55 are switches contained in the first group of switches 45, and the switch 54 is in the "off" position while the switch 55 is in the on position. 56 to 63 are rewinding switches contained in the above-mentioned second switch group 15, and the drawing shows their normal position.

FIG. 8 is an enlarged drawing of the auto-fader operation part in FIG. 2. At the time of normal photographing the shutter opening angle knob 4 is placed in a fully opened position and the auto fader operation knob 3 is slid to the left whereby the claw part 41E of the plate 41 engages with the notched part 10A. As the slot 41A engages with the guide axle 43 at this time, the opening angle operation part 33 is fixed and at the same time the auto-fader operation knob 3 is fixed. At this time, although not shown in the drawing, there should be clicks at both left and right positions to which the plate 41 is slid. It is also possible to fix the positions of the shutter opening angles one-half, one-fourth by the notched parts 10B, 10C. When in the state as shown in the drawing the knob 3 is pushed upward (to the state shown by chain line) the plate 41 rotates around the axle 44 along the slot 41D and the pin 40 moves upward by the slot 41B, therefore the auto-fade slide plate 33 moves upward around the axle 34 and the claw part 33C engages with the screwed part 8B, thus fade in action is achieved. At the same time by pushing the knob 3 downward fade out action is accomplished.

Figure 9:
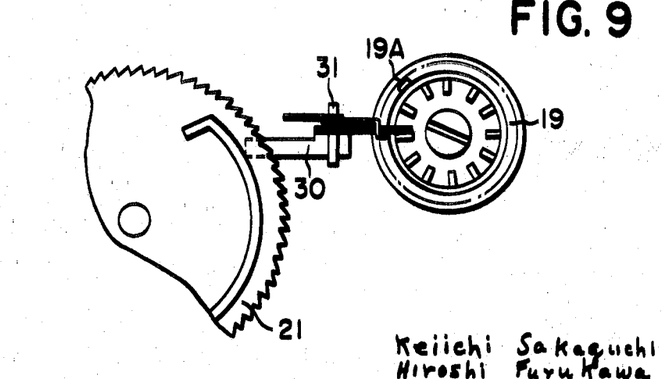
FIG. 9 and FIG. 10 are detailed views for a take up drum reduction gear modified from the first embodiment.
Figure 10:
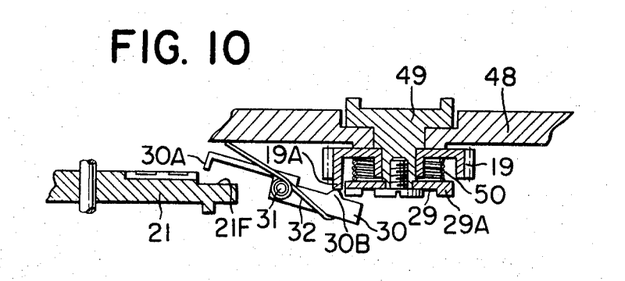

FIG. 9 and FIG. 10 show an improvement of the above-mentioned take up drum part, and while the rotation of the take up drum is prevented by the member 30 in the above-mentioned structure, intermittent reduction action can be done in this improvement. By providing a projection 19A on the upper surface of the take up drum gear 19, when one end 30A of the member 30 is positioned at the cam part 21F of the programming member, the rotation of the take up drum is prevented and the gear 19 only rotates in a slipping condition, but as the projection 19A rotates and pushes up the part 30B of the member 30, the engagement of the member 30 and the teeth 29A is released and the take up drum 49 rotates. As soon as the projection 19A passes the position of 30B the member 30 engages again with the teeth 29A. Thus, if ten of the teeth 29A are provided on the member 29, the rotation of the take up drum 49 is reduced to one-tenth of that of the take up gear 19.

Figure 11:
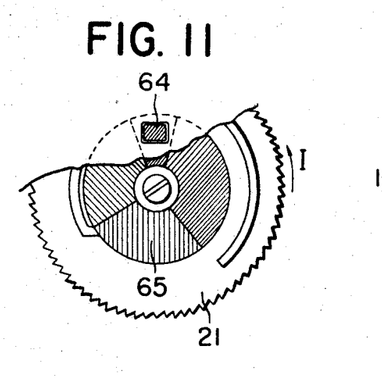
FIG. 11 and FIG. 12 illustrate program condition indication devices for modified embodiments.

In FIG. 11, 64 is an indication window and 65 is an indication plate which rotates in integral engagement with the programming member 21. Four kinds of colors or patterns are provided on the indication plate 65 to show the state of the programming part, that is, normal position, normal advancing state (fade out), rewinding state, normal advancing state (fade in), thus the user can find out in what state his camera is in by checking the window 64.

Figure 12:
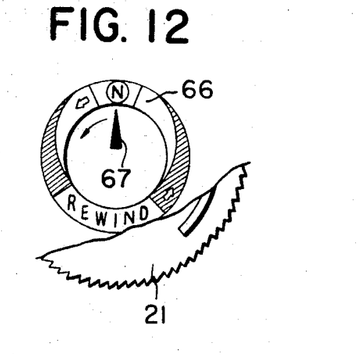

FIG. 12 shows another example of the indication device, wherein a fixed indication plate 66 for showing each process mentioned above and a mark 67 which rotates integrally with the programming member 21 is provided. By the position of said mark the operating state of the camera can be clearly known at a glance. It is convenient for operation of camera to provide such indication device at the window on the outside of camera or within the finder.

Next, the present invention shall be expalined in detail about the operation and function.

[For normal photographing]

FIG. 1 to FIG. 3 show the normal state. In this state, as the advancement claw 22 is positioned at the no-teeth ratchet part 21B of the programming member 21, the programming member 21 is in the non-active state. Any desired shutter opening angle can be set by rotating the shutter opening angle control member 4. The member 4 can be fixed by shifting the auto-fade operation member 3 to left. While the electric circuit in this state will be as shown in FIG. 7, even when rewinding operation is done by the member 4 and the contact 56 comes in contact with the contact 59 and the contact (terminal) 57 comes in contact with the contact (terminal) 60 while the contact (terminal) 61 comes in contact with the contact (terminal) 63, the contact (terminal) 53 is in off position, thus rewinding can be prevented.

[For auto-fade photographing]

After shifting the auto-fade knob 3 to right to release locking, by moving the knob 3 downward fade out can be done automatically while fade in can be done also automatically by moving the knob 3 upward. By moving the knob 3 downward the claw part 33B of the auto-fade slide plate 33 in FIG. 3 engages the screw 8A and the rack 33A moves to the right side of the stroke B, thus the gear 12 is rotated. This stroke B corresponds to the $\beta_1$ in FIG. 5. By this the link member 16 moves to right by the pin 13A on the plate 13 in FIG. 2, and at a result the two shutter blades perform continuously fade out function at a predetermined reduction rate by the opening angle control mechanism 9. For performing fade in, the shutter blades are fully opened by the operation member 4 and the knob 3 is moved upward, then the claw part 33C engages the screw 8B thus such action as being reverse to the above-mentioned fade out action is performed.

[For overlapping photographing]

A. When accompanied by auto-fade effect:

While the auto-fade operation knob is shifted to right to release the locking, the shutter blades are placed in a fully opened position by the opening angle operation member 4. By moving the overlapping operation member 2 in the direction of the arrow, the ratchet teeth advancing spring 25 moves to left as much as the distance A shown in FIG. 3, and the programming member 21 rotates to the direction of the arrow I as much as the angle $\alpha_1$. At this time as explained before, the overlapping operation member 2 is retained at the left hand side. After the rotation of the programming member 21 by the angle $\alpha_1$ is done, the advancing claw 22 engages with the ratchet teeth 21A and the release switch 49 is placed in on position, and then, the rotation of the gear 20 brings the programming member 21 into rotating condition through by the advancement claw 22 and the eccentric part 20A, and as the member 21 further rotates as much as the angle $\alpha_2$, the pin 36A moves upward around the axle 38 by the cam 21C for fade out, therefore the pin 40 installed at the plate 37 through the spring 39 is shifted downward, thus fade out function is carried out as explained before.

At the same time as the above-mentioned member 30A drops onto the cam part 21F at the reverse side of the programming member 21 by the rotation by the angle $\alpha_1$, the rotation of the take up drum 49 is stopped or reduced. Thus the film which is fed into the film magazine by a film transport mechanism, not shown in the drawing, is housed within the magazine in such state as loosely bent or as being loosely wound. As the programming member 21 further rotates as much as the angle $\alpha_3$, the pin 36A comes off the cam 21C for fade out and the auto-fade mechanism becomes neutral and at the same time the contact 55 in FIG. 7 is placed in off state by the printed circuit board 46 at the reverse side of the programming member 21 and the first switch group 45, while the contact 54 is placed in on state, therefore the motor 51 stops rotating. Next, as the opening angle control member 4 is moved from its fully closed position to the rewinding position against the spring 11, the contact 56 comes in contact with the contact 59, the contact 57 with the contact 57 and the contact 61 with the contact 63, respectively by the printed circuit board 14 and the second switch group 15, thus rewinding circuit is formed and the motor 51 rotates in the reverse direction. At this time as the programming member 21 is sent to the direction shown by the arrow I by the ratchet mechanism regardless of the direction of movement whether normal advancing or rewinding, it rotates as much as the angle $\alpha_4$ and the contact 55 is placed in on state while the contact 54 is placed in off state by the printed circuit board 46 and the first switch group 45, thus the film is rewound until the motor 51 stops rotating. At this time since $\alpha_3$ and $\alpha_4$ are so set as being equal to each other, such length of film as being required for fade out is rewound.

The member 30 which has been dropped at the cam 21F in the process of $\alpha_2$ and $\alpha_3$ passes through the tapered part 21G of the cam part and is returned to its normal position.

Then, after removing hand off the release, as the hand is taken off the opening angle control member 4, the opening angle control member 4 returns automatically to the fully closed position by the spring 11, and the second switch group 15 returns to its normal position. After that as the release switch 53 is placed in on state for photographing second scene to be overlapped, the motor 51 rotates to normal direction and at the same time the pin 36A moves downward by the fade in cam 21D of the programming member 21, thus fade in photographing is carried out by such action as being reverse to the above-mentioned fade out action. Then as the programming member 21 rotates as much as the angle $\alpha_5$ ($= \alpha_3$) and fade in is completed, the pin 36A comes off the cam 21D and the auto fade mechanism returns to its neutral position.

Further, as the programming member 21 completes one revolution to the state shown in FIG. 3, the advancement claw 22 comes to the position of the no teeth part 21B, thus the programming member 21 stops its action. However, since the electric circuit is such state as shown in FIG. 7, the photographing can be continued without stopping. Before the advancement claw 22 comes to the position of the no teeth part 21B the projection part 21E of the programming member 21 pushes one end 26B of the retainer member 26, and the 26A escapes from the 23A, then the overlapping operation member 2 is returned to its original position by the spring 24.

B. When not accompanied by auto-fade effect:

In overlapping photographing techniques there are cases when auto fade is not necessarily required for example in title photographing, etc. Such requirements can be easily satisfied by the present invention. The auto-fade operation knob 3 is shifted from its neutral position to left hand side to fix the shutter opening angle control member, which has been set at the neutral position beforehand. As the same operation as that in the above-mentioned overlapping photographing is done in this state, even if the fade out cam 21C, the fade in cam 21D of the programming member 21 pushes up or pushes down the pin 36A, since the plate 41 is fixed, the rotation of the plate 36 is absorbed by the spring 39 which exists between the plate 36 and the plate 37 and is not transmitted to the auto-fade mechanism, thus overlapping photographing not accompanied by auto fade effect can be performed.

C. For using auto-fade effect only at one way of overlapping photographing:

In each process in the above-mentioned operations, only when auto-fade is used, the auto-fade operation knob 3 is moved to right to leave it in a free state, thereby overlapping photographing only at one way of the fade in, fade out can be done, or overlapping photographing by auto-fade can be done.

[For auto-fade photographing]

When simple fade out or fade in photographing with auto is done, the overlapping operation member 2 is not operated, but after the auto-fade operation member 3 is shifted to the right to release locking, by moving the member 3 downward fade out photographing is done, while by moving the member 3 upward fade in photographing is done.

As has ben explained above, the present invention is to provide an entirely unique overlapping device by which overlapping can be easily done with a constant length of film for forward transport and for rewinding transport, and at the same time, which has such mechanism as achieving high degree of automation and completely preventing failure in photographing derived from erroneous handling, and has such indication device as can inform the state of each operating process.

Next, explanations will be made on a modified embodiment of the present invention in which a film counter is used referring to FIGS. 13 and 14.

Figure 14:
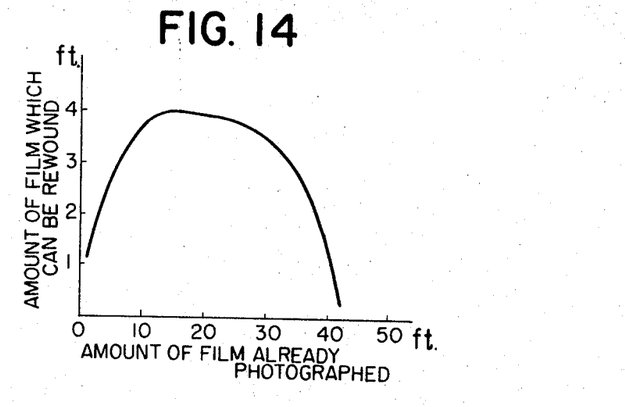
FIG. 14 is a graph illustrating the relation between the film amount in the take-up chamber and the amount of film capable of rewinding.

According to this embodiment, the relation between the film amount in the take-up chamber and the film amount capable of rewinding is as shown in FIG. 14. The amount of film which can be rewound at the start of the film is very small, and if the amount of photographed film is longer than 42 – 43 feet, it is almost impossible to rewind the film.

Figure 13:
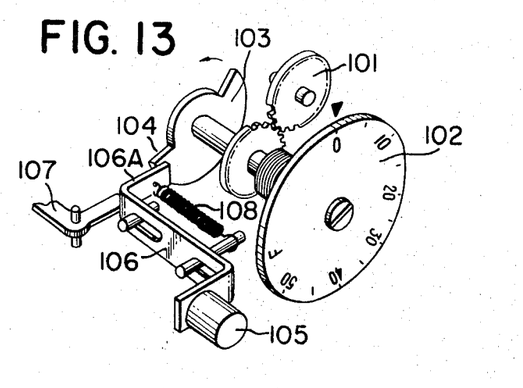
FIG. 13 is another embodiment partially shown modified from the first embodiment.

In FIG. 13, 101 is a gear associated with a film driving system comprising the motor 51 for actuating a conventional type of film counter 102, and 103 is a safety device associated with the film counter 102. 104 is a notched portion of the safety device, and 105 is an operation button for the rewinding mechanism similar to that as illustratively shown in FIG. 2. 108 is a spring for displacing a slide plate 106 integrally provided with the operation button 105 to a normal position, 107 and is a linking member for actuating the rewinding mechanism. 106A is a portion of the slide plate 106 contacting the safety device 103.

In the embodiment shown in FIG. 2 the shutter opening angle control member 4 serves both for manual fading and rewinding. However, this shutter opening control member 4 may be modified so that it serves only for manual fading and the operation button 105 shown in FIG. 13 is adopted to serve for the rewinding, for example through engagement of the linking member 107 with the pin 13A in FIG. 2 with the aid of a one-way mechanism delivering motion in a direction from the shutter angle opening to the shutter angle closure.

In FIG. 13, the film counter is shown to be in the position [0]. Under this condition even if the operator pushes down the button 105 it is impossible to rewind the film because the safety device hinders the portion 106A of the slidee plate 106. By proceeding the photographing, the film counter advances and the safety device 103 rotates in the direction marked by an arrow so that the notched portion 104 meets the portion 106A to permit the rewinding operation. When the photographing is further proceeded and the film counter reaches 42 or 43 feet, the notched portion 104 passes over and the safety device 103 meets with the portion 106A to prohibit the rewinding operation.

According to the film counter as described above, by the safety device associated with the film counter, it is possible to prevent automatically an erroneous operation such that a rewinding operation is erroneously conducted under a condition which prohibits such operation.

We claim:

1. A film transport control device for a motion picture camera, comprising, in combination, a means for controlling the amount of light admitted to the camera, a fading mechanism operatively engageable with said means, a film transport mechanism for transporting film in both the normal direction and the reverse direction within the camera, a driving means connected to and arranged to drive both said means for controlling the amount of light and said transport mechanism, and a driving circuit arranged to change the driving mode of said driving means, a switching means for controlling said driving circuit, said switching means arranged through said driving circuit to establish said driving means in one of a normal transport state, a pause state, and a reverse transport state, a control means selectively operatively connectible to said driving means for operating said fading mechanism and said switching means at selected times, said control means comprises a programming means and a rotatable means, said programming means is rotatable in one body with said rotatable means for controlling said fading mechanism and said switching mechanism, and said programming means includes programming portions for controlling time intervals of a preparation step in which said rotatable means is moved into the rotating position in engagement with said driving means, of a fade-out step for the photographing action with the motion picture camera, of a rewind step for the film, and of a fade-in step for the photographing action with the motion picture camera, operating means for actuating said control means, said operating means having an operative position and an inoperative position and being automatically returned from the operative position to the inoperative position by said programming means when the time interval of the fade-in step controlled by said programming means is completed, and said programming means effecting the release from engagement of said driving means and said rotatable means and effecting the pausing action of said rotatable means in the preparation step of said operating means when overlapping photography is completed.

2. A film transport control device, as set forth in claim 1, wherein said programming means comprises a programming cam means rotated with said rotatable means.

3. A film transport control device, as set forth in claim 2, wherein said programming cam means includes a cam member operatively engageable with said fading mechanism.

4. A film transport control device, as set forth in claim 2, wherein said programming cam means comprises a first cam member controlling the interval of said fade-in operation, and a second cam member controlling the interval of fade-out operation.

5. A film transport control device, as set forth in claim 1, wherein said driving means comprised film take-up means for the take-up of film transported by said transport means.

6. A film transport control device, as set forth in claim 5, wherein said control means includes a braking means for arresting the movement of said film take-up means in response to the action of said programming means.

7. A film transport control device, as set forth in claim 5, wherein said control means comprises an indicator means for indicating the various operating conditions of said programming means.

8. A film transport control device, as set forth in claim 5, wherein said control means comprises a braking means for reducing the speed of the film take-up movement of said film take-up means in response to the action of said programming means.

9. A film transport control device, as set forth in claim 5, wherein said driving means comprises an indicating means for indicating the amount of film transported.

10. A film transport control device, as set forth in claim 5, wherein said control means comprises reset means for resetting said operating means for its operative position to its inoperative position when said programming means is in the position it assumes when fade-in operation is completed.

11. A film transport control device, as set forth in claim 10, wherein said operating means comprises retaining means for holding said operating means in the operative position.

12. A film transport control device, as set forth in claim 1, wherein said driving means includes a portion engageable with said rotatable means in order to drive said rotatable means in one direction only regardless of the rotational direction of said driving means.

13. A film transport control device, as set forth in claim 12, wherein said rotatable means comprises a ratchet-toothed member engageable with said portion of said driving means.

14. A film transport control device, as set forth in claim 12, wherein said driving means comprises a member for preventing irregular rewind operation.

15. A film transport control device, as set forth in claim 13, wherein said ratchet-toothed member has a portion thereon free of teeth in the path of the ratchet teeth.

16. A film transport control device, as set forth in claim 1, wherein said switching means comprises at least a first and a second electrical switch member, said first electrical switch member arranged to control said driving circuit for a first change-over from normal winding to rewind-back and a successive second change-over from rewind-back to normal winding, and said second electrical switch member operatively connected to said fading mechanism for bringing said driving circuit into the rewind-back condition only when said first switch member is changed over for rewind-back.

17. A film transport control device, as set forth in claim 16, wherein said switching means includes a manually operable means to bring said second switch member into the inoperative condition.

* * * * *